L. J. HEDDERICH.
LINER FOR CENTRIFUGAL LIQUID SEPARATORS.
APPLICATION FILED JAN. 26, 1912.
1,025,567.
Patented May 7, 1912.
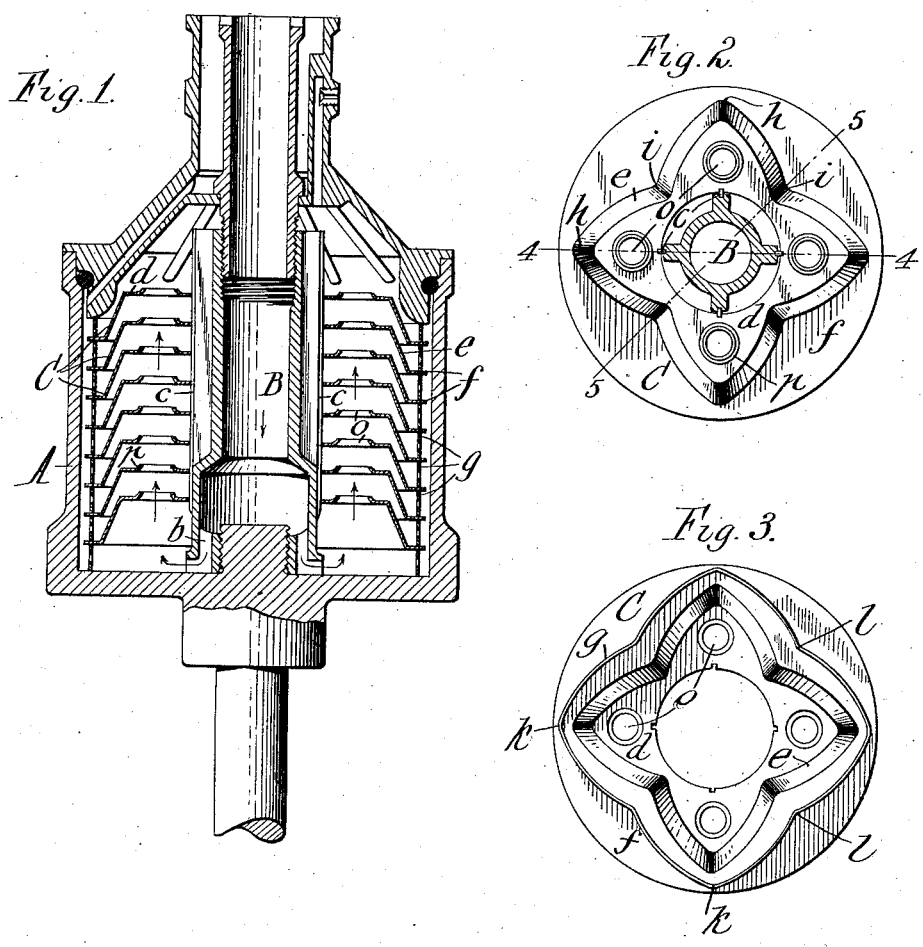
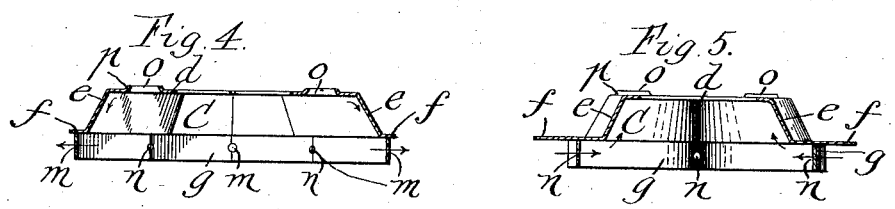
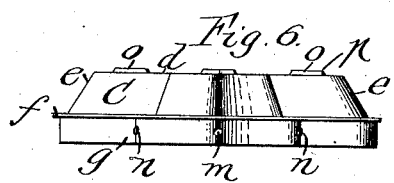
Witnesses:
A. Birkenhagen
F. E. Prochnow
Inventor
Lander J. Hedderich,
By Wilhelm, Parker & Hard,
Attorneys.
COLUMBIA PLANOGRAPH CO., WASHINGTON, D. C.

ns and reëntering angles $i$. The spacing wall $g$ has the same outline as the face wall $e$ and its salient portions $k$ and reëntering portions $l$ are provided, respectively, with flow passages $m$ and $n$. The top plate $d$ may be provided with openings $o$ which are arranged in the neutral zone of the separating space and through which the milk flows upwardly and distributes itself between the disks, or the disks may be otherwise provided with flow passages for the full milk. These openings are arranged inwardly of the salient angles $h$ of the disks and are preferably provided with upwardly projecting collars $p$ which prevent the cream particles flowing inwardly over the upper surface of the top plate of the disk from mingling with the incoming full milk flowing upwardly through the openings $o$.

UNITED STATES PATENT OFFICE.

LEANDER J. HEDDERICH, OF MULBERRY, INDIANA, ASSIGNOR TO ALBAUGH-DOVER CO., OF CHICAGO, ILLINOIS.

LINER FOR CENTRIFUGAL LIQUID-SEPARATORS.

1,025,567. Specification of Letters Patent. Patented May 7, 1912.

Application filed January 26, 1912. Serial No. 673,554.

*To all whom it may concern:*

Be it known that I, LEANDER J. HEDDERICH, a citizen of the United States, residing at Mulberry, in the county of Clinton and State of Indiana, have invented a new and useful Improvement in Liners for Centrifugal Liquid-Separators, of which the following is a specification.

This invention relates to that class of liners or separating inserts for centrifugal creamers which are composed of a number of disks or disk-like units or members arranged loosely one upon the other in the separating space of the bowl.

The object of this invention is to produce a liner which is simple and efficient and which provides proper flow passages for the cream inwardly toward the cream wall and for the skim milk outwardly toward the periphery of the bowl.

In the accompanying drawings: Figure 1 is a sectional elevation of a centrifugal cream separator provided with this improved liner. Fig. 2 is a top plan view and Fig. 3 a bottom plan view of one of the disks or units of the liner. Figs. 4 and 5 are vertical sections through one of the disks in lines 4—4 and 5—5, Fig. 2, respectively, these figures illustrating the direction of the flow of the separated liquids. Fig. 6 is an elevation of one of the disks or units.

Like reference characters refer to like parts in the several figures.

A represents a centrifugal separating bowl of any suitable or well known construction.

B represents the vertical central feed pipe through which the milk enters and from which it passes outwardly near the bottom of the bowl through openings $b$ into the separating space of the bowl.

C represents the separating disks which are arranged in the separating space of the bowl around the feed pipe and which may be centered in any suitable manner, for instance, by upright ribs $c$ on the feed pipe. Each disk comprises a flat or horizontal top plate or portion $d$, an outer wall $e$ extending obliquely downwardly from the top plate to a horizontal marginal plate or portion $f$, and an upright spacing wall $g$ which extends from the marginal portion $f$ downwardly and rests on the marginal plate of the next lower disk. The sloping outer or face wall $e$ of the disk is so shaped as to form a number of lobes or projecting portions having salient angles $h$ and reëntering angles $i$. The spacing wall $g$ has the same outline as the face wall $e$ and its salient portions $k$ and reëntering portions $l$ are provided, respectively, with flow passages $m$ and $n$. The top plate $d$ may be provided with openings $o$ which are arranged in the neutral zone of the separating space and through which the milk flows upwardly and distributes itself between the disks, or the disks may be otherwise provided with flow passages for the full milk. These openings are arranged inwardly of the salient angles $h$ of the disks and are preferably provided with upwardly projecting collars $p$ which prevent the cream particles flowing inwardly over the upper surface of the top plate of the disk from mingling with the incoming full milk flowing upwardly through the openings $o$.

Under the action of centrifugal force the skim milk particles flow outwardly along the under side of each disk to the skim milk zone, while the cream particles or globules of butter fat flow inwardly along the upper side of the disk to the cream wall. The inner surfaces of the lobes direct the skim milk to the salient portions thereof and to the passages or openings $m$ through which the skim milk passes outwardly. The outer surfaces of the lobes direct the cream particles to the reëntering angles $i$ thereof and to the passages $n$ through which cream particles which are separated outside of the lobes return to the space within the lobes. The outlet passages $m$ for the skim milk are comparatively small and offer some resistance to the outward flow of the skim milk, whereby this outward flow is retarded, the distribution of the full milk among the several disks is equalized, and the separation within the lobes is improved.

I claim as my invention:

1. The combination with a centrifugal liquid separating bowl, of a liner composed of superposed units, each comprising salient and reëntering portions which are provided at the salient angles with outflow passages for the skim milk and at the reëntering angles with inflow passages for cream particles, and a top plate extending from said salient and reëntering portions inwardly, substantially as set forth.

2. The combination with a centrifugal liquid separating bowl, of a liner composed of superposed units, each comprising salient and reëntering portions which are provided at the salient angles with outflow passages for the skim milk and at the reëntering angles with inflow passages for cream particles, and a top plate extending from said salient and reëntering portions inwardly, said top plate being provided with flow passages for the full milk arranged approximately in the neutral zone of the separating space, substantially as set forth.

3. The combination with a centrifugal liquid separating bowl, of a liner composed of superposed units each comprising an inclined face wall having salient and reëntering angles, a top plate extending from said face wall inwardly, a horizontal marginal plate at the base of said inclined face wall, and an upright spacing wall having salient and reëntering angles and provided with flow passages at said angles, substantially as set forth.

4. A unit for a liner for centrifugal liquid separators comprising an inclined face wall forming lobes with salient and reëntering angles, a top plate, a marginal plate at the base of said face wall, and an upright spacing wall having salient and reëntering angles similar to those of said lobes and having flow passages at said angles, substantially as set forth.

Witness my hand in the presence of two subscribing witnesses.

LEANDER J. HEDDERICH.

Witnesses:
 PERCY V. RUCH,
 BENTON J. BLOOM.

---

Copies of this patent may be obtained for five cents each, by addressing the "Commissioner of Patents, Washington, D. C."

---